UNITED STATES PATENT OFFICE.

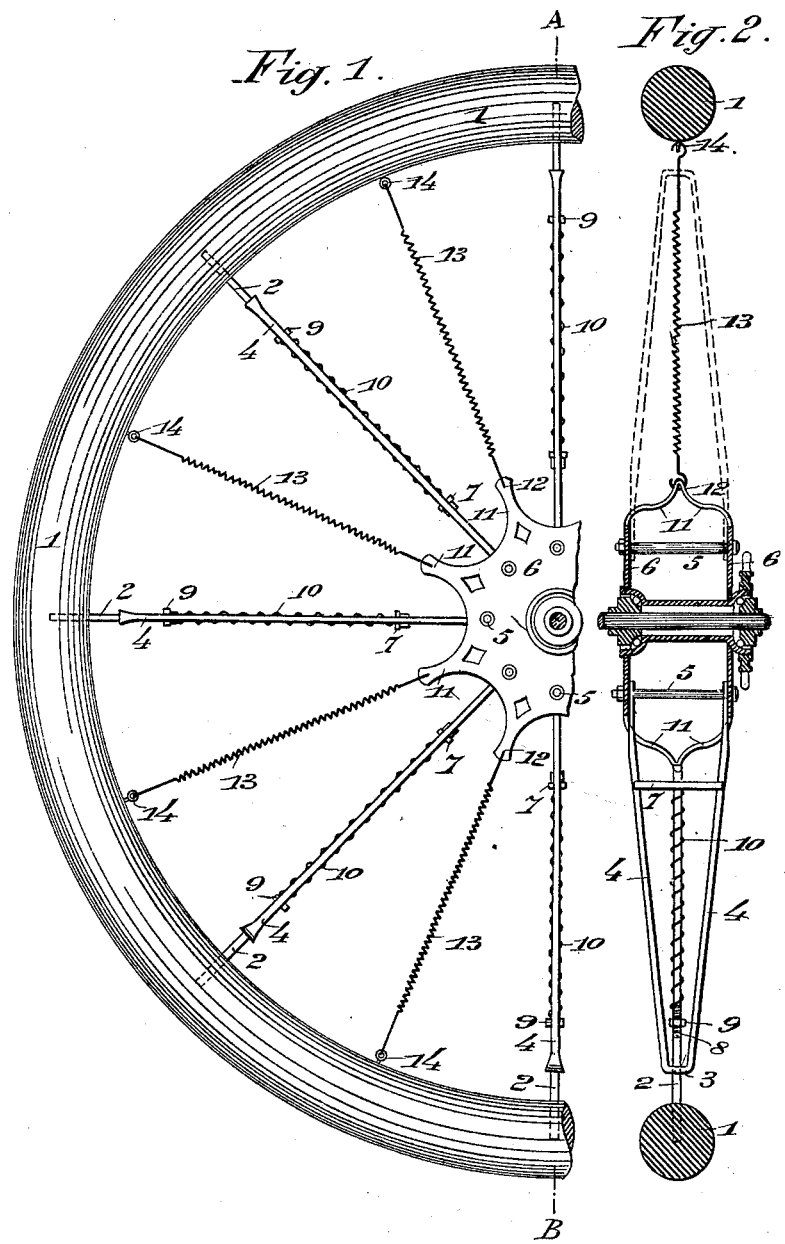

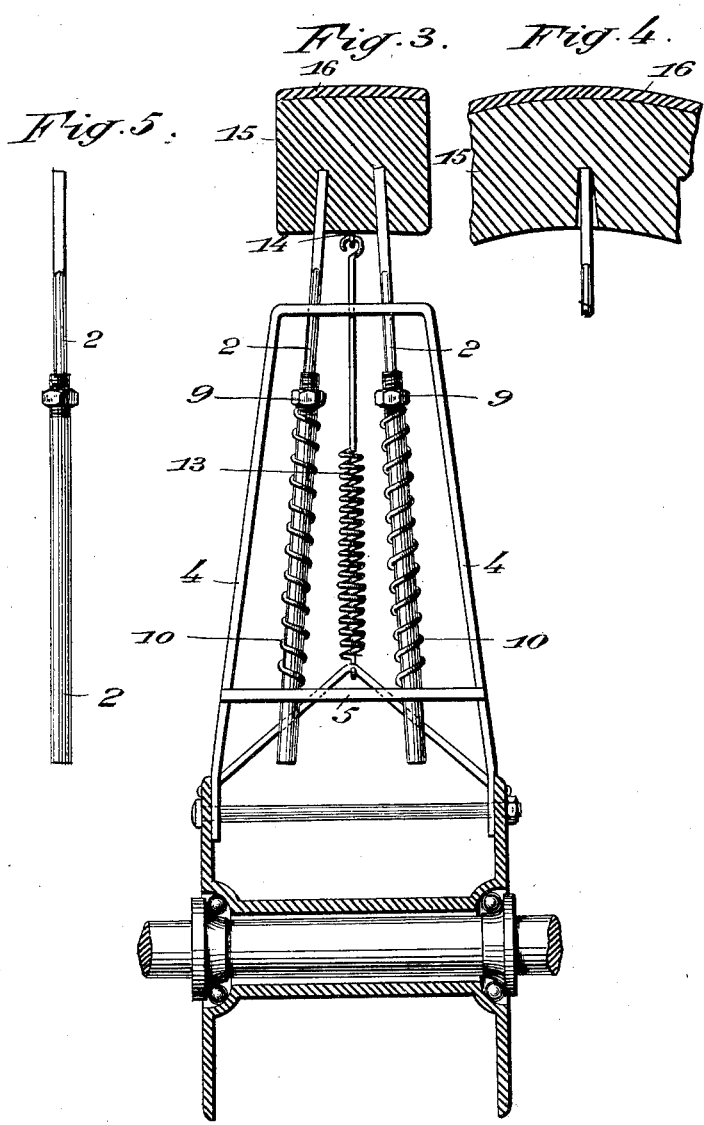

WILLEM JAN HUBERT VERHEGGEN, DANIEL HENRICUS JOHANNES VAN MENS, AND PAULUS FRANCISCUS VAN KEEP, OF BREDA, NETHERLANDS.

WHEEL.

SPECIFICATION forming part of Letters Patent No. 681,761, dated September 3, 1901.

Application filed March 27, 1901. Serial No. 53,075. (No model.)

*To all whom it may concern:*

Be it known that we, WILLEM JAN HUBERT VERHEGGEN, DANIEL HENRICUS JOHANNES VAN MENS, and PAULUS FRANCISCUS VAN KEEP, subjects of the Queen of the Netherlands, and residents of Breda, Netherlands, have invented certain new and useful Improvements in Wheels, of which the following is a specification.

Our present invention relates to a wheel the construction of which allows pneumatic or other tires to be dispensed with while retaining the rigid rim of ordinary vehicles. In this wheel shocks and jarring movements are resisted and deadened by springs without transmitting any vibration to the hub of the wheel.

In the accompanying drawings, Figure I is an elevation of one-half of a wheel constructed in accordance with the principles of this invention. Fig. II is a section on line A B of the same wheel. Fig. III is a partial section of another form of construction of the wheel shown in Figs. I and II. Figs. IV and V are detail views.

The wheel consists of a stiff rim 1 of the ordinary construction, which may have a round or prismatical section, may be hollow or solid, and be made of wood or metal. On the inside of the rim are fixed hollow or solid rods 2, acting as spokes. Each of these rods is adapted to slide in an opening formed in the outer side 3 of a stirrup 4, which is fastened by means of a bolt 5 to two plates 6, having the shape of a star and fixed to the hub of the wheel. The branches 11 of these plates 6 are bent inward in such a way that the branches of the plate situated on one side of the wheel meet the branches of the plate situated on the opposite side of the hub. The rod 2 also slides in an opening made in a cross-piece 7, connecting the two branches of the before-described stirrup. The rod is screw-threaded at 8, and on this thread is screwed a nut 9, against which bears a coiled spring 10, surrounding the rod and bearing against the cross-piece 7. On the opposite side of the hub at the point 12 where the two branches 11 meet is hooked a spring 13, the other end of which is secured to an eyelet 14, fixed to the inside surface of the rim.

In the above description the stirrups are placed opposite the coiled tension-springs. These springs, however, can be placed in diametrical line opposite each other, just as the stirrups, or at a mutual angle.

The wheel works in the following manner: Supposing the rim to encounter an obstacle or any unevenness of the road, the shock received by the rim is immediately transmitted to the rod 2; but the latter not being in direct communication with the hub does not transmit the shock, the latter being absorbed by the coiled spring 10, which is compressed, while the tension-spring 13 is drawn out by the hub for a short space of time. It results from this that the hub retains its position nearly in the center of the rim, while having sufficient mobility to permit the working of the compression-springs 10 and the tension-springs 13, so as to deaden any shocks.

It can be easily understood that the above-described device will give to vehicles upon which our wheels are used a very easy motion, while at the same time it permits the use of an ordinary rim, so that a strong, simple, and serviceable wheel is obtained, which is not so easily injured as is one provided with a pneumatic tire.

Fig. 3 shows a form of construction of the invention which can be applied to motor-cars, carriages, and all heavy vehicles. In this type of wheel the rods or spokes 2 are set in pairs, one pair to each stirrup 4, the rods of such pair being placed abreast of each other and sustained by coiled encircling compression-springs 10, seated upon the cross-bar 5 of the stirrup and adjusted as to tension by nuts 9, threaded upon said rods. The star plates have their branches bent inwardly and obliquely upward until they meet centrally over the hub instead of being fancifully curved, as in Fig. 2, and tension-springs 13 are attached thereto at the apex or central meeting-point of said branches and extend to the rim in the plane of the corresponding stirrup and between the two spring-borne rods appertaining to said stirrup, the cross-bar 5 being slotted centrally to admit the inbent branches of the star plates, and the straight reach or stem of said spring plays through the outer bar of the stirrup abreast of said rods, so that it operates concurrently with the two compression-springs 10, seated in the opposite stirrup. By this construction the shock-deadening power is doubled.

In the detail view, Fig. 4, and by reference to the cross-section of the rim shown in Fig. 3 it will be seen that the rods or spokes are confined to the rim in sockets which are of transverse width just sufficient to admit them, but flare outwardly in the plane of the rim to allow the necessary play of said spokes as the hub rises and falls. It will also be noticed that the rim is shod with an ordinary carriage-tire.

Having now fully described our invention, what we claim, and desire to secure by Letters Patent, is—

1. In an improved wheel, the combination of two plates, made in the form of a star, placed one on each side of the boss, having their branches bent inward, with metal tubes or rods fixed to the inner edge of the wheel-rim, these tubes or rods being slidably arranged in suitable stirrups fixed to the before-mentioned plates, the said rods or tubes being surrounded by compression-springs one end of each spring bearing against a cross-piece fixed to the stirrup and the other end bearing against an adjustable nut screwed on the said rod, substantially as set forth.

2. In an improved wheel the combination of two plates made in the form of a star, placed one on each side of the boss, having their branches bent inward until they meet, and means for attaching the ends of coiled tension-springs bent in the form of a hook, the other end of each spring hooking into an eyelet fixed to the inner side of the wheel-rim.

3. In an improved wheel, the combination of two plates made in the form of a star placed one on each side of the boss, having their branches bent inward, and means for attaching the ends of coiled tension-springs bent in the form of a hook, the other end of each spring hooking into an eyelet fixed to the inner side of the wheel-rim the said spring being always in the same diametrical line as a compression-spring situated on the other side of the boss, substantially as set forth.

4. In an improved wheel, the combination of two plates made in the form of a star, placed one on each side of the boss, and having their branches bent inward until they meet centrally over the hub, coiled tension-springs hooking at the inner end over said branches at their meeting-point, and at the outer end into eyelets fixed to the inner side of the rim, stirrups through the outer bars of which the straight reaches or stems of said springs play, rods or spokes entering sockets in the rim and playing through outer and inner bars of said stirrup, one on each side of and abreast with the tension-spring thereto appertaining, compression-springs coiled around said rods and seated at the inner ends against inner bars of said stirrups, and adjusting-nuts screw-threaded upon said rods against which the outer ends of said springs abut; each stirrup and the tension-spring and pair of spring-borne rods thereto appertaining being arranged diametrically opposite a corresponding stirrup, tension-spring and pair of spring-borne rods.

In testimony whereof we have hereunto set our hands in presence of two witnesses.

WILLEM JAN HUBERT VERHEGGEN.
DANIEL HENRICUS JOHANNES VAN MENS.
PAULUS FRANCISCUS VAN KEEP.

Witnesses:
J. D. FÜHRINA,
AIRE H. VOORWINDEN.